(12) United States Patent
Ou et al.

(10) Patent No.: US 9,742,760 B1
(45) Date of Patent: Aug. 22, 2017

(54) SYSTEM AND METHOD FOR IMPROVING LOGIN AND REGISTRATION EFFICIENCY TO NETWORK-ACCESSED DATA

(71) Applicant: TouchofModern, San Francisco, CA (US)

(72) Inventors: Steven Ou, San Francisco, CA (US); Jerry Hum, San Francisco, CA (US)

(73) Assignee: TouchofModern, Inc., San Francisco, CA (US)

( * ) Notice: Subject to any disclaimer, the term of this patent is extended or adjusted under 35 U.S.C. 154(b) by 0 days.

(21) Appl. No.: 14/739,118

(22) Filed: Jun. 15, 2015

Related U.S. Application Data

(60) Provisional application No. 62/012,726, filed on Jun. 16, 2014.

(51) Int. Cl.
*G06F 21/30* (2013.01)
*H04L 29/06* (2006.01)

(52) U.S. Cl.
CPC ............ *H04L 63/083* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 9,166,967 B2* | 10/2015 | Berkovitz | ............... | G06F 21/41 |
| 2001/0054155 A1* | 12/2001 | Hagan | ................ | G06F 21/6254 |
| | | | | 713/193 |
| 2015/0020178 A1* | 1/2015 | Grunin | .................... | H04L 63/08 |
| | | | | 726/7 |
| 2015/0113381 A1* | 4/2015 | Fu | ........................... | H04W 4/18 |
| | | | | 715/234 |
| 2015/0215315 A1* | 7/2015 | Gordon | ............... | H04L 63/0884 |
| | | | | 726/5 |

* cited by examiner

*Primary Examiner* — Trang Doan
(74) *Attorney, Agent, or Firm* — Morgan, Lewis & Bockius LLP

(57) ABSTRACT

A system, comprising: memory operable to store at least one program; at least one processor in communication with the memory, in which the at least one program, when executed by the at least one processor, causes the at least one processor to perform the steps of: receiving an initial request for access to restricted data from a client device, the initial request including a user identifier; determining whether the user identifier is associated with any of a plurality of user registration records for accessing the restricted data; transmitting login data to the client device if the user identifier is associated with one of the plurality of user registration records and transmitting registration data to the client device if the user identifier is not associated with any of the plurality of the user registration records.

30 Claims, 6 Drawing Sheets

SYSTEM AND METHOD FOR IMPROVING LOGIN AND REGISTRATION EFFICIENCY TO NETWORK-ACCESSED DATA

CROSS-REFERENCE TO RELATED APPLICATIONS

This application claims the benefit of U.S. Provisional Patent Application No. 62/012,726 filed Jun. 16, 2014 entitled "SYSTEM AND METHOD FOR IMPROVING LOGIN AND REGISTRATION EFFICIENCY TO NETWORK-ACCESSED DATA", incorporated by reference herein in its entirety.

FIELD OF THE INVENTION

The present invention generally relates to improving login and registration efficiency of network-accessed data such as web pages.

BACKGROUND

Currently, network-accessed data, such as websites, suffer from the problem of having two or more separate processes for login or registration. Situations may arise where a user wastes time navigating between both the login stage and the registration stage because the user, for example in a website, forgot login credentials (e.g. username and password) or mistakenly believed that he or she had already registered with the website.

In an example instance, a user may have forgotten that he or she has login credentials and may select to register for access to the website. After the user takes the time to register, the website may inform the user that the user has already registered. Now the user must return to the login web page and enter the login credentials to access the website.

Alternatively, a user may have forgotten that he or she does not have login credentials and may select to login for access to the website. After the user takes the time to login, the website may inform the user that the user has not registered with the website. Now the user must visit the registration web page and enter the registration information to access the website.

Both scenarios can be a tedious and time-consuming process for the user, as the user may visit both the login and registration web pages before accessing the website. A website with a structure that results in wasted time for a user is less desirable and may result in lost user interest.

There exists a need for network-accessed data, such as websites, that improve login and registration efficiency to improve the user experience.

BRIEF SUMMARY OF THE INVENTION

In one embodiment, there is a system, comprising: memory operable to store at least one program; at least one processor in communication with the memory, in which the at least one program, when executed by the at least one processor, causes the at least one processor to perform the steps of: receiving, from a client device, an initial request for access to restricted data, the initial request including a user identifier; determining whether the user identifier is associated with any of a plurality of user registration records for accessing the restricted data; transmitting login data to the client device if the user identifier is associated with one of the plurality of user registration records and transmitting registration data to the client device if the user identifier is not associated with any of the plurality of the user registration records.

In a further embodiment, the at least one processor further performs the step of: receiving, from the client device, a login request to access the restricted data, the login request including the user identifier provided in the initial request and a password provided after the step of transmitting the login data.

In a further embodiment, the at least one processor further performs the step of: receiving, from the client device, a registration request to access the restricted data, the registration request including the user identifier provided in the initial request and a password provided after the step of transmitting the registration data.

In a further embodiment, the user identification is an email address of the user.

In a further embodiment, the login data includes the user identifier provided in the initial request and a user-fillable password field configured to receive a user password associated with the user identifier.

In a further embodiment, the registration data includes the user identifier provided in the initial request and a user-fillable password field configured to receive a user password associated with the user identifier.

In a further embodiment, the initial request for access is a request for access to a restricted web page of a website.

In a further embodiment, the login data comprises a web page.

In a further embodiment, the registration data comprises a web page.

In a further embodiment, the user identifier is the only user-provided data in the initial request.

In one embodiment, there is a computer-implemented method comprising: receiving, from a client device, an initial request for access to restricted data, the initial request including a user identifier; determining whether the user identifier is associated with any of a plurality of user registration records for accessing the restricted data; transmitting login data to the client device if the user identifier is associated with one of the plurality of user registration records and transmitting registration data to the client device if the user identifier is not associated with any of the plurality of the user registration records.

In a further embodiment, the method further comprising: receiving, from the client device, a login request to access the restricted data, the login request including the user identifier provided in the initial request and a password provided after the step of transmitting the login data.

In a further embodiment, the method further comprising: receiving, from the client device, a registration request to access the restricted data, the registration request including the user identifier provided in the initial request and a password provided after the step of transmitting the registration data.

In a further embodiment, the user identification is an email address of the user.

In a further embodiment, the login data includes the user identifier provided in the initial request and a user-fillable password field configured to receive a user password associated with the user identifier.

In a further embodiment, the registration data includes the user identifier provided in the initial request and a user-fillable password field configured to receive a user password associated with the user identifier.

In a further embodiment, the initial request for access is a request for access to a restricted web page of a website.

In a further embodiment, the login data comprises a web page.

In a further embodiment, the registration data comprises a web page.

In a further embodiment, the user identifier is the only user-provided data in the initial request.

In one embodiment, there is a non-transitory computer readable storage medium having stored thereon computer-executable instructions which, when executed by a processor, performs the steps of: receiving, from a client device, an initial request for access to restricted data, the initial request including a user identifier; determining whether the user identifier is associated with any of a plurality of user registration records for accessing the restricted data; transmitting login data to the client device if the user identifier is associated with one of the plurality of user registration records and transmitting registration data to the client device if the user identifier is not associated with any of the plurality of the user registration records.

In a further embodiment, the at least one processor further performs the step of: receiving, from the client device, a login request to access the restricted data, the login request including the user identifier provided in the initial request and a password provided after the step of transmitting the login data.

In a further embodiment, the at least one processor further performs the step of: receiving, from the client device, a registration request to access the restricted data, the registration request including the user identifier provided in the initial request and a password provided after the step of transmitting the registration data.

In a further embodiment, the user identification is an email address of the user.

In a further embodiment, the login data includes the user identifier provided in the initial request and a user-fillable password field configured to receive a user password associated with the user identifier.

In a further embodiment, the registration data includes the user identifier provided in the initial request and a user-fillable password field configured to receive a user password associated with the user identifier.

In a further embodiment, the initial request for access is a request for access to a restricted web page of a website.

In a further embodiment, the login data comprises a web page.

In a further embodiment, the registration data comprises a web page.

In a further embodiment, the user identifier is the only user-provided data in the initial request.

BRIEF DESCRIPTION OF THE SEVERAL VIEWS OF THE DRAWINGS

The foregoing summary, as well as the following detailed description of embodiments of the system and method, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 1:
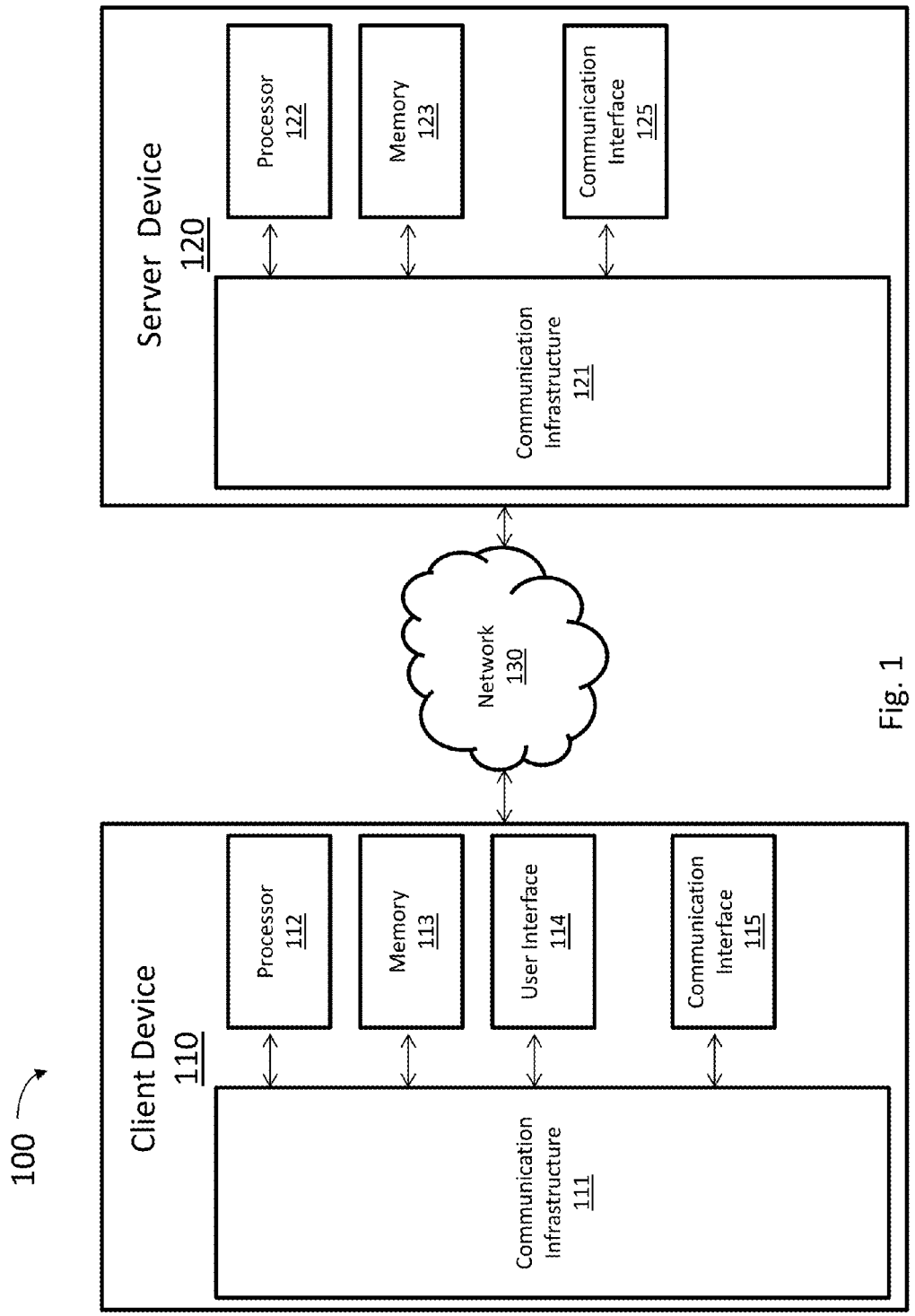
FIG. 1 shows a block diagram that illustrates an example system for improving login and registration efficiency to access network-accessed data according to at least one embodiment of the present invention.

The example embodiments of the present invention, discussed below, improve login and registration efficiency by reducing the amount of user interactions (e.g., user selections and user inputs via a graphical user interface). Instead of requiring a user to select whether to login to or register for access to network-accessed data (e.g., a restricted access website), at least some embodiments of the present invention streamline the process by integrating portions of the login and registration process, thereby removing the need for a user to make the selection.

In addition to reducing the amount of user interactions, embodiments of the present invention improve upon existing computer technologies by reducing the amount of computer processing required by the user and host computers. Each time a user requests network-accessed data from a host computer, the user's computer must utilize computer processing resources to generate and transmit a request (e.g., an HTTP request) to the host computer. The host computer must then utilize computer processing resources to generate and transmit a response (e.g., an HTTP response) to the user's computer. Reducing the number of generated computer requests and responses by integrating portions of the login and registration process in accordance with embodiments of the present invention results in a reduction in the amount of computer processing resources required at the user and host computers. These computer processing resources can then be re-allocated to other computing functions, such as generating graphical user interfaces for the user at the user's computer or processing requests from other users at the host computer.

Embodiments of the present invention also improve computer technology by reducing the amount of computer processing required by the computer network to process the requests and responses from the user's computer and the host computer. Computer networks are implemented as a network of routers that connect the user's computer and the host computer. The network of routers utilize computer processing resources to process and route the requests and responses from the user and host computers to the proper recipient. Reducing the number of computer requests and responses generated by the user and host computers by integrating portions of the login and registration process results in a reduction in the amount of computer processing resources required by the network of routers to process and route the requests and responses. These computer processing resources can then be re-allocated to other computing functions, such as routing requests and responses from other computers connected to the network.

Referring to the drawings in detail, wherein like reference numerals indicate like elements throughout, there is shown in FIGS. 1-5, a system and methods for improving login and registration efficiency, generally designated, in accordance with an exemplary embodiment of the present invention.

FIG. 1 shows a block diagram that illustrates a system 100 for improving login and registration efficiency to access network-accessed data according to at least one embodiment of the present invention. In at least one embodiment, the system 100 may include one or more computers or servers, non-transitory memory operable to store one or more computer programs and one or more processors to implement the one or more computer programs. For example, the system 100, shown in FIG. 1, may include client device 110, server device 120 and network 130.

Client device 110 may be a computing device for receiving inputs from a user, requesting network-accessed data from server device 120 via network 130 and/or displaying data from service device 120 at the request of a user. Examples of a client device 110 may include a smart phone, tablet or a personal computer, among others.

Server device 120 may be any computing device for receiving and/or responding to requests for network-accessed data from client device 110. Examples of network-accessed data may include web page data, hyper text markup language (HTML), text, video, picture, software, executable, interpretable, byte-code, and binary files.

In one embodiment, server device 120 is a web server that hosts a website. Client device 110 may request network-accessed data, such as web page data, from server device 120 based on a hyper text transfer protocol (HTTP). In one embodiment, client device 110 may transmit HTTP GET requests to retrieve network-accessed data from server device 120. In one embodiment, client device 110 may transmit HTTP POST requests to store network-accessed data at server device 120. Server device 120 may receive the network-accessed data requests and transmit the network-accessed data to client device 110. The user may instruct client device 110 to request network-accessed data from server device 120 using HTTP requests. Server device 120 may respond to network-accessed data requests by sending network-accessed data to client device 110. In one embodiment, network-accessed data may include web page data such as an HTML web page. In one embodiment, network-accessed data may include an HTML form that may contain user-input elements including user-fillable fields such as text fields, checkboxes, and radio-buttons, as well as user-selectable icons such as submit buttons. In one embodiment, server device 120 may respond to asynchronous (i.e. in the background) network-accessed data requests from client device 110 that do not alter the display and behavior of the network-accessed data displayed on client device 110. One of ordinary skill in the art will appreciate that system 100 is not limited to the use of HTML or HTTP, and that embodiments of the present invention can be used with any computer communication language or network protocol suitable for the purposes of the described communications between client device 110 and server device 120.

Client device 110 may include communication infrastructure 111, processor 112, memory 113, user interface 114 and communication interface 115. Server device 120 may include communication infrastructure 121, processor 122, memory 123 and communication interface 125.

Processor 112 or processor 122 may be any type of processor, including but not limited to a special purpose or a general-purpose digital signal processor. Processor 112 is connected to a communication infrastructure 111 (for example, a bus or network). Processor 112 is connected to a communication infrastructure 121 (for example, a bus or network). Various software implementations are described in terms of this exemplary computer system.

Memory 113 or memory 123 may include at least one of: random access memory (RAM), a hard disk drive and a removable storage drive, such as a floppy disk drive, a magnetic tape drive, or an optical disk drive, etc. The removable storage drive reads from and/or writes to a removable storage unit. The removable storage unit can be a floppy disk, a magnetic tape, an optical disk, etc., which is read by and written to a removable storage drive. Memory 113 and/or memory 123 may include a computer usable storage medium having stored therein computer software programs and/or data to perform any of the computing functions of client device 110 and/or server 120. Computer software programs (also called computer control logic), when executed, enable client device 110 and/or server 120 to implement embodiments of the present invention as discussed herein. Accordingly, such computer software programs represent controllers of client device 110 and/or server 120. Memory 123 may include one or more datastores that store network-accessed data such as web page data, software files or any other types of data files. Server device 120 may retrieve the network-accessed data from memory 123 before transmitting to client device 110 via network 130. Memory 123 may include one or more data stores that store user registration records. Each user registration record includes at least one username and password associated with a registered user. To access restricted network-accessed data, a user may be required to provide login credentials (e.g. a username and password) that matches one of the user registration records.

User interface 114 may be a program that controls a display (not shown) of client device 110. User interface 114 may include one or more peripheral user interface components, such as a keyboard or a mouse. The user may use the peripheral user interface components to interact with client device 110. User interface 114 may receive user inputs, such as mouse inputs or keyboard inputs from the mouse or keyboard user interface components. User interface 114 may display network-accessed data, such as web pages, on the display of client device 110 using a web browser. A web browser may be an application with the ability to render HTML pages, Cascading Style Sheets (CSS) and JavaScript content on the display of user interface 114. User interface 114 may display network-accessed data, such as web pages, on the display of client device 110 using a mobile software application. One of ordinary skill in the art will appreciate that user interface 114 is not limited to displaying network-accessed data using a web browser or a mobile software application, and that embodiments of the present invention may contemplate using other display devices or software suitable for the purposes of the displaying the network-accessed data.

Communication interface 115 and/or communication interface 125 allow network-accessed data to be transferred between client device 110 and server device 120. Examples of communication interface 115 or communication interface 125 may include a modem, a network interface (such as an Ethernet card), a communication port, a Personal Computer Memory Card International Association (PCMCIA) slot and card, etc. Network-accessed data transferred via communication interface 115 or communication interface 125 are in the form of signals, which may be electronic, electromagnetic, optical, or other signals capable of being transmitted or received by communication interface. These signals are provided to or received from communication interface 115 and communication interface 125 via network 130.

Network 130 connects client device 110 and server device 120 by carrying signals. Network 130 may be implemented using wire or cable, fiber optics, a phone line, a wireless link, a cellular phone link, a radio frequency link, or any other suitable communication channel. For instance, network 130 may be implemented using a combination of channels. Network 130 may be implemented as an intranet and/or an internet.

Figure 2A:
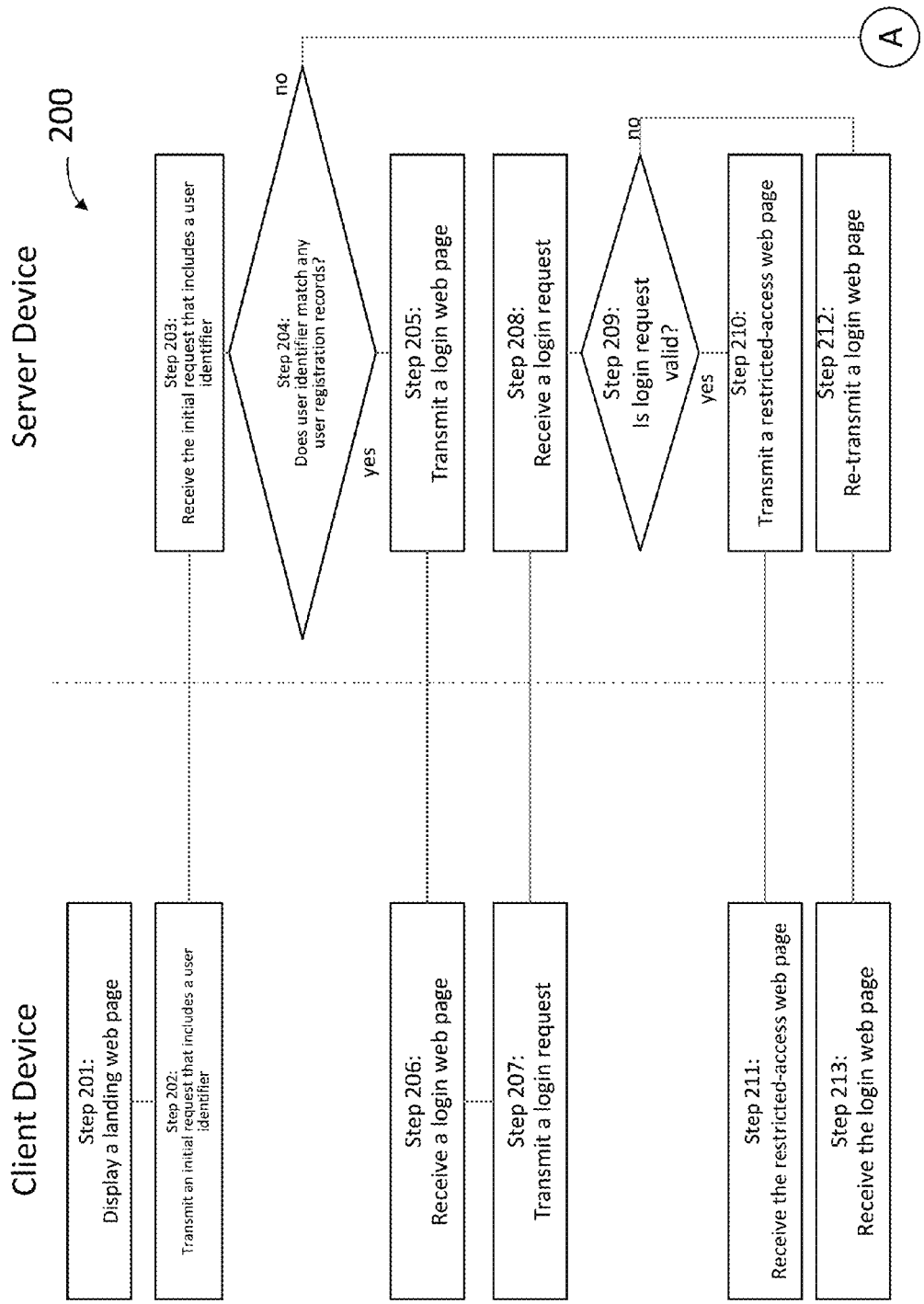
FIGS. 2A-2B show a block diagram that illustrates an example method for improving website login and registration efficiency according to at least one embodiment of the present invention.
Figure 2B:
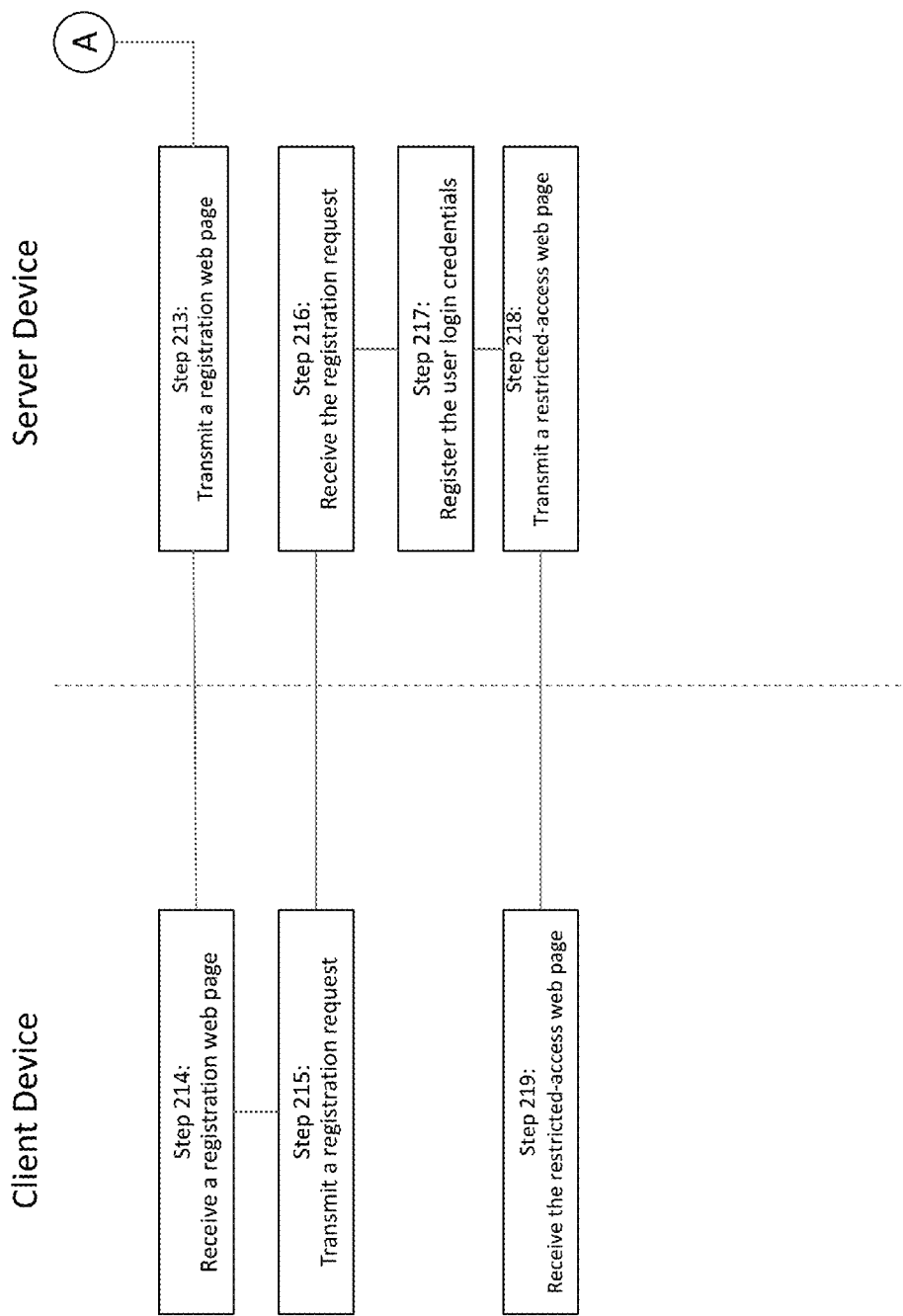

FIGS. 2A-2B show a block diagram that illustrates a method 200 for improving website login and registration efficiency according to at least one embodiment of the present invention.

Figure 3:
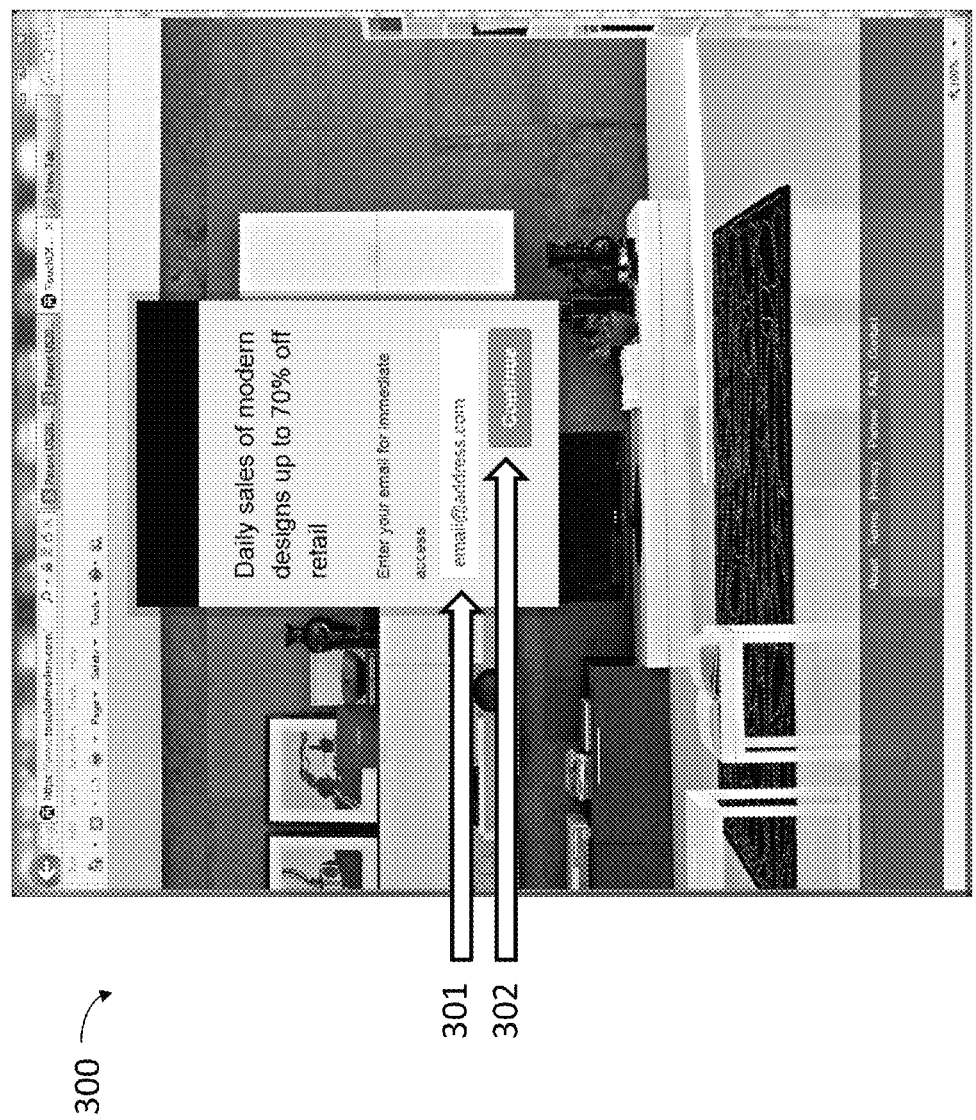
FIG. 3 shows an exemplary screenshot of a landing web page that may be displayed on a client device in accordance with one embodiment of the present invention.

At step 201, client device 110 displays initial network-accessed data, such as landing web page data for a website, hosted by server device 120 using user interface 114. In one embodiment, landing web page data is a landing web page. FIG. 3 shows an exemplary screenshot of a landing web page 300 that may be displayed on client device 110. The landing web page 300 is the initial web page that a user may view before the user can access other portions of the website. The landing web page may include a user-fillable field 301. A user-fillable field may be a field configured to receive a user text input. In one embodiment, the user-fillable field 301 may be for receiving a user identifier that identifies a user requesting access to a website. In one embodiment, the user identifier may be an email address. In another embodiment, the user identifier may be a username. One of ordinary skill in the art will appreciate that user identifiers are not limited to these examples but may be any form of identifier sufficient to differentiate the user from other users and potential users, and that the appropriate form of the identifier may be a dictated embodiment of the present invention chosen for implementation. In one embodiment, the user fillable field 301 is the only user-fillable field of the landing web page 300. The landing web page 300 may also include user-selectable icon 302.

At step 202, after a user has provided an identifier as an input to user-fillable field 301 and selected user-selectable icon 302, client device 110 may transmit, to server device 120, an initial request for network-accessed data, such as web page data, to continue the login process or to register for access to restricted data. An example of restricted data may include restricted network-accessed data, such as restricted portions of a website. One of ordinary skill in the art will appreciate that restricted data is not limited to this example but may be any form of data that the user cannot access without first registering for access, and that the appropriate form of the restricted data may be a dictated embodiment of the present invention chosen for implementation. The initial request may include the user identifier previously provided by the user at user-fillable field 301. In one embodiment, the user identifier previously provided by the user is the only user-provided identification information in the initial request. In one embodiment, the initial request is an HTTP GET request.

At step 203, after client device 110 transmits the initial request to server device 120, server device 120 may receive the initial request.

At step 204, server device 120 may determine whether the user is registered to access the restricted network-accessed data, such as the restricted portions of a web site, by determining whether the user identifier is associated with any user registration records that include login credentials previously registered with server device 120. After registration, login credentials allow a client device to access restricted network-accessed data, such as restricted portions of a website, hosted by server device 120. Login credentials include both a user identifier and an associated password. To access the restricted network-accessed data, such as restricted portions of a website, client device 110 may be required to transmit, at some point and not necessarily at the same time, a valid user identifier and a valid password associated with the user identifier. However, before accessing the restricted network-accessed data, such as restricted portions of the website, server device 120 determines whether the user identifier is associated with any login credentials by comparing the user identifier in the initial request to the user identifiers stored in memory 123. In one embodiment, server device 120 compares the user identifier in the initial request to the user identifiers in memory 123 by querying a datastore with the user identifier in the initial request for user registration records that include the user identifier in the initial request. The datastore may return, to server device 120, user registration record results of the query including any user registration record that include a user identifier that matches the user identifier in the initial request. If the user identifier in the initial request matches any of the user identifiers stored in the datastore, server device 120 determines that the user has previously registered to access the restricted network-accessed data, such as the restricted portions of the website. If the user identifier in the initial request does not match any of the user identifiers stored in the datastore, server device 120 determines that the user has not previously registered to access the restricted network-accessed data, such as the restricted portions of the website.

At step 205, if server device 120 determines that the user has previously registered to access the restricted network-accessed data, such as the restricted portions of the website, server device 120 may transmit network-accessed login data to continue the login process to client device 110. An example of login data is login web page data. In one embodiment, login web page data is a login web page. One of ordinary skill in the art will appreciate that login data is not limited to these examples but may be any form of data that aids a user with accessing restricted data, and that the appropriate form of the login data may be a dictated embodiment of the present invention chosen for implementation.

Figure 4:
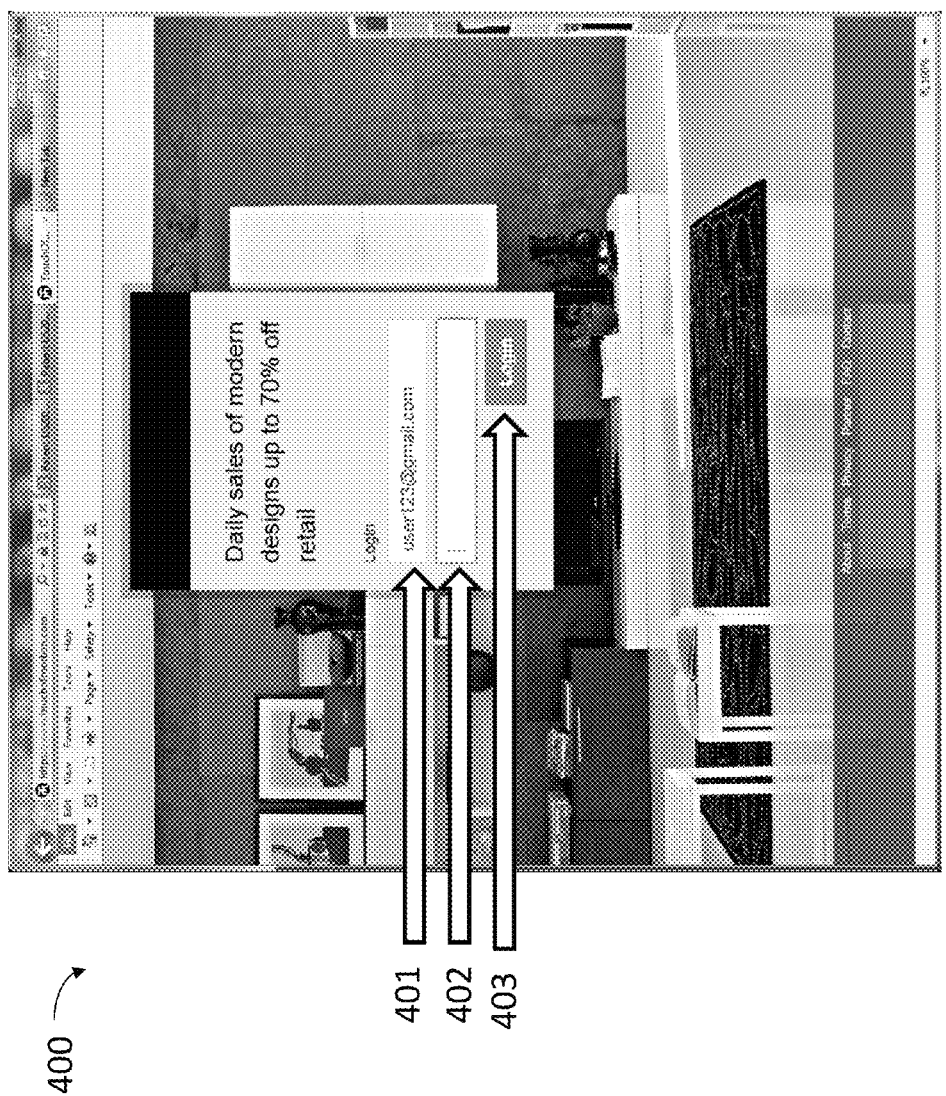
FIG. 4 shows an exemplary screenshot of a login web page that may be displayed on a client device in accordance with one embodiment of the present invention.

FIG. 4 shows an exemplary screenshot of a login web page 400 that may be displayed on client device 110. The login webpage 400 is a webpage where an already registered user may attempt to access other portions of the website by providing the password associated with the previously-provided user identifier. Login web page 400 may include a field 401 that includes the user identifier previously supplied by the user in the initial request. Login web page 400 may also include a user-fillable field 402. In one embodiment, the user-fillable field 402 may be configured to receive a user password associated with the user identifier previously supplied by the user in the initial request. In one embodiment, the user fillable field 402 is the only user-fillable field of the login web page 400. Login web page 400 may also include user-selectable icon 403, that, when selected, causes the client device 110 to transmit a request to server device 120 to login the user to the website.

At step 206, after server device 120 transmits the network-accessed login data to continue the login process, such as login web page data, to client device 110, client device 110 may receive the login web page data from server device 120.

At step 207, after a user selects the user-selectable icon 403, via a mouse input for example, client device 110 may transmit a login request that includes login credentials, to server device 120, for access to restricted network-accessed data, such as restricted portions of a website that requires login credentials before granting access to the restricted portions. The login request may include the user identifier previously provided by the user. The login request may include the user password provided by the user at user-fillable field 402. In one embodiment, the password provided by the user at login web page 400 is the only user-provided identification information in the login request provided after the initial request. In one embodiment, the login request is an HTTP GET request.

At step 208, after client device 110 transmits the login request to server device 120, server device 120 receives the login request.

At step 209, server device 120, determines whether the login request is valid by determining whether the user identifier and password provided by the user are associated with any login credentials previously registered with server device 120. To determine whether the user identifier and password are associated with any login credentials, server device 120 compares the user identifier and password to the user identifiers and corresponding passwords stored in memory 123. In one embodiment, server device 120 compares the user identifier and password previously provided in the login request to the user identifiers and corresponding passwords in memory 123 by querying a datastore for user registration records that include the user identifier and password previously-provided in the login request. The datastore may return, to server device 120, user registration record results of the query that include a user identifier and corresponding password that match the user identifier and password previously-provided by in the login request. If the user identifier and password match any of the user identifiers and corresponding passwords stored in the datastore, server device 120 determines that client device 110 may access restricted network-accessed data, such as restricted portions of the website that require login credentials. If the user identifier and password do not match any of the user identifiers stored in the datastore, server device 120 determines that client device 110 may not access restricted network-accessed data, such as restricted portions of the website that require login credentials.

At step 210, if server device 120 determines that the login request is valid and that client device 110 may access restricted network-accessed data, such as restricted portions of the website that require login credentials, at step 209, server device 120 may transmit restricted network-accessed data, such as restricted web page data to client device 110. At step 211, client device 110 receives the restricted network-accessed data, such as the restricted web page data.

At step 212, if server device 120 determines that the login request is invalid and that the client device 110 may not access portions of the website that require login credentials, at step 209, server device 120 may re-transmit the network-accessed login data to continue the login process, such as the login web page, to client device 110 and may transmit a notification that the previously-provided user identifier and password do not match any stored records for the website. At step 213, client device 110 receives the network-accessed login data to continue the login process, such as the re-transmitted login web page.

At step 213, if the user identifier in the initial request does not match any of the user identifiers, as determined at step 204, server device 120 may transmit network-accessed registration data to start the registration process to client device 110. An example of network-accessed registration data is registration web page data. One of ordinary skill in the art will appreciate that registration data is not limited to these examples but may be any form of data that aids a user with requesting access to restricted data, and that the appropriate form of the registration data may be a dictated embodiment of the present invention chosen for implementation.

Figure 5:
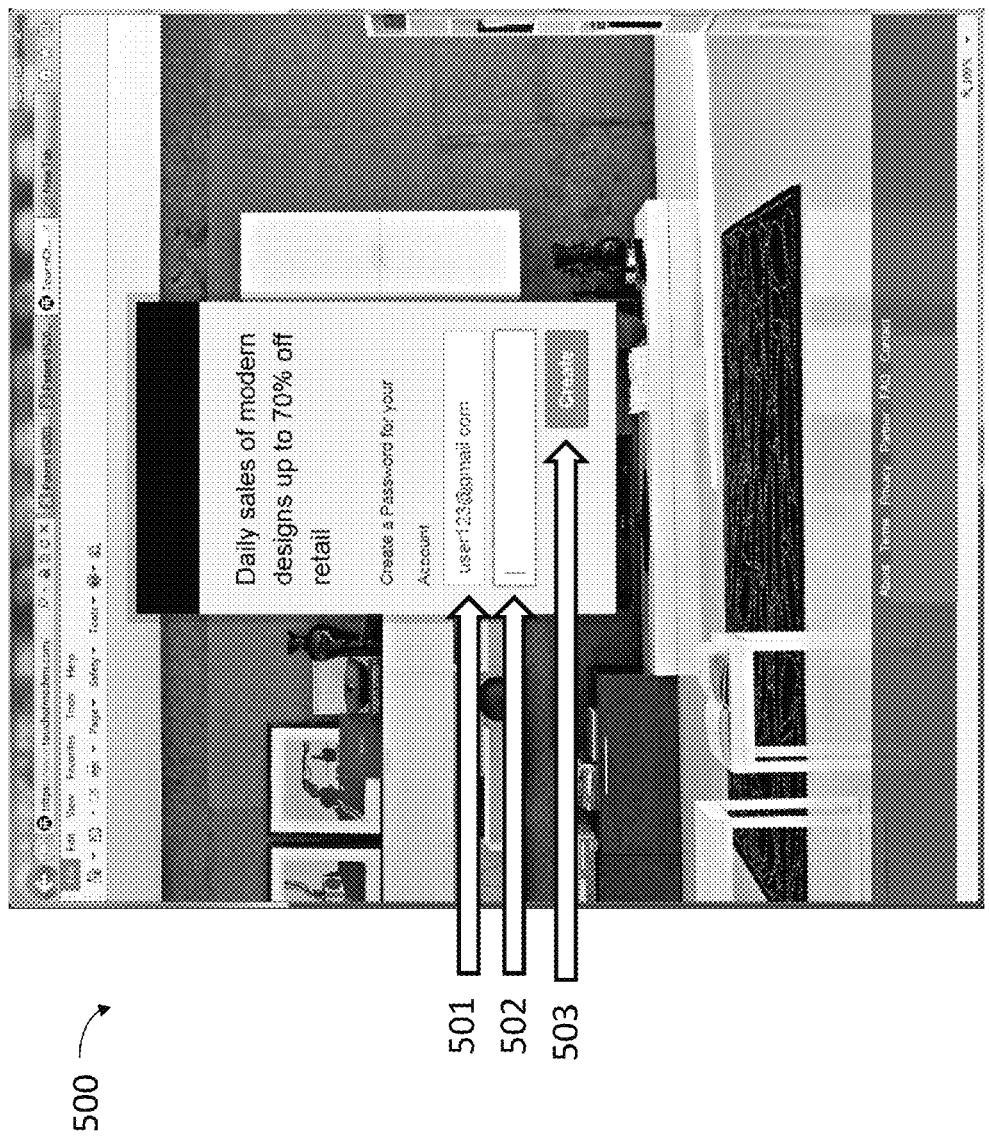
FIG. 5 shows an exemplary screenshot of a registration web page that may be displayed on client device in accordance with one embodiment of the present invention.

FIG. 5 shows an exemplary screenshot of a registration web page 500 that may be displayed on client device 110. The registration webpage 500 is a webpage that allows an unregistered user to register for access to restricted portions of the website by providing a password to associate with the previously-provided user identifier. Registration web page 500 may include a field 501 that includes the user identifier previously provided by client device 110 in the initial request. Registration web page 500 may also include a user-fillable field 502. In one embodiment, the user-fillable field 502 may be configured to receive a user password to associate with the user identifier previously supplied by the user in the initial request to register the user with the website. Registration web page 500 may also include user-selectable icon 503 that, when selected, causes the client device 110 to transmit a registration request to server device 120 to register the user with the website.

At step 214, after server device 120 transmits the network-accessed registration data to start the registration process, such as registration web page data, to client device 110, client device 110 may receive the registration web page data from server device 120.

At step 215, after a user selects the user-selectable icon 503, via a mouse input for example, client device 110 may transmit a registration request, to server device 120, to register the user for access restricted network-accessed data, such as restricted portions of a website, that require login credentials. The registration request may include the user identifier previously provided by the client device in the initial request. The registration request may include the user password provided by the user at user-fillable field 502 on the registration web page 500. In one embodiment, the password provided by the user at the registration web page 500 is the only user-provided identification information provided after the initial request that is included in the registration request. In one embodiment, the registration request is an HTTP POST request.

At step 216, after client device 110 transmits the registration request to server device 120, server device 120 receives the registration request.

At step 217, after server device 120 receives the registration request, server device 120 registers the login credentials of the user with the host of the network-accessed data, such as a website. To register the login credentials of the user with the host of the network-accessed data, server device 120 may transmit a request to a datastore or memory 123 to store a user registration record that includes the user identifier and password previously-provided by the client device 110. The datastore or memory 123 may return, to server device 120, results of the request to store the user identifier and password indicating that the registration was successful.

At step 218, after server device 120 has received the results of the request to store the user identifier and password indicating that the registration was successful, server device 120 may transmit the restricted network-accessed data, such as restricted-access web page data, to client device 110. At step 219, client device 110 receives the restricted network-accessed data, such as restricted-access web page data.

As described above, by integrating the login and registration process for the user, website owners can reduce unnecessary user input and user selections, thereby improving the overall experience for the user.

In at least one embodiment, the system 100 includes one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

The non-transitory computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A system, comprising:
    memory operable to store at least one program;
    at least one processor in communication with the memory, in which the at least one program, when executed by the at least one processor, causes the at least one processor to perform the steps of:
        providing a first user interface to a client device, the first user interface including a user identifier field to allow a user to provide a user identifier to the client device;
        receiving, from the client device, an initial request for access to restricted data, the initial request including the user identifier provided by the user via the first user interface on the client device;
        determining whether the user identifier in the initial request is associated with any of a plurality of user registration records for accessing the restricted data;
        transmitting a login user interface including login data to the client device if the user identifier provided by the user via the first user interface is associated with one of the plurality of user registration records;
        providing the restricted data to the client device if a login request received from the user via the client device meets login criteria;
        transmitting a registration user interface including registration data to the client device if the user identifier provided by the user via the first user interface is not associated with any of the plurality of the user registration records; and
        providing the restricted data to the client device if a registration request is received from the user via the client device.

2. The system of claim 1, wherein the at least one processor further performs the step of:
    receiving, from the client device, a login request to access the restricted data, the login request including the user identifier provided in the initial request and a password provided after the step of transmitting the login data.

3. The system of claim 1, wherein the at least one processor further performs the step of:
    receiving, from the client device, a registration request to access the restricted data, the registration request including the user identifier provided in the initial request and a password provided after the step of transmitting the registration data.

4. The system of claim 1, wherein the user identifier is one of: an email address of the user and a username of the user.

5. The system of claim 1, wherein the login data includes the user identifier provided in the initial request and a user-fillable password field configured to receive a user password associated with the user identifier.

6. The system of claim 1, wherein the registration data includes the user identifier provided in the initial request and a user-fillable password field configured to receive a user password associated with the user identifier.

7. The system of claim 1, wherein the initial request for access is a request for access to a restricted web page of a website.

8. The system of claim 1, wherein the login data comprises a web page.

9. The system of claim 1, wherein the registration data comprises a web page.

10. The system of claim 1, wherein the user identifier is the only user-provided data in the initial request.

11. A computer-implemented method comprising:
    providing a first user interface to a client device, the first user interface including a user identifier field to allow a user to provide a user identifier to the client device;
    receiving, from the client device, an initial request for access to restricted data, the initial request including the user identifier provided by the user via the first user interface on the client device;

determining whether the user identifier in the initial request is associated with any of a plurality of user registration records for accessing the restricted data;

transmitting a login user interface including login data to the client device if the user identifier provided by the user via the first user interface is associated with one of the plurality of user registration records;

providing the restricted data to the client device if a login request received from the user via the client device meets login criteria;

transmitting a registration user interface including registration data to the client device if the user identifier provided by the user via the first user interface is not associated with any of the plurality of the user registration records; and providing the restricted data to the client device if a registration request is received from the user via the client device.

12. The method of claim 11, the method further comprising:

receiving, from the client device, a login request to access the restricted data, the login request including the user identifier provided in the initial request and a password provided after the step of transmitting the login data.

13. The method of claim 11, the method further comprising:

receiving, from the client device, a registration request to access the restricted data, the registration request including the user identifier provided in the initial request and a password provided after the step of transmitting the registration data.

14. The method of claim 11, wherein the user identifier is an email address of the user.

15. The method of claim 11, wherein the login data includes the user identifier provided in the initial request and a user-fillable password field configured to receive a user password associated with the user identifier.

16. The method of claim 11, wherein the registration data includes the user identifier provided in the initial request and a user-fillable password field configured to receive a user password associated with the user identifier.

17. The method of claim 11, wherein the initial request for access is a request for access to a restricted web page of a website.

18. The method of claim 11, wherein the login data comprises a web page.

19. The method of claim 11, wherein the registration data comprises a web page.

20. The method of claim 11, wherein the user identifier is the only user-provided data in the initial request.

21. A non-transitory computer readable storage medium having stored thereon computer-executable instructions which, when executed by a processor, performs the steps of:

providing a first user interface to a client device, the first user interface including a user identifier field to allow a user to provide a user identifier to the client device;

receiving, from the client device, an initial request for access to restricted data, the initial request including the user identifier provided by the user via the first user interface on the client device;

determining whether the user identifier in the initial request is associated with any of a plurality of user registration records for accessing the restricted data;

transmitting a login user interface including login data to the client device if the user identifier provided by the user via the first user interface is associated with one of the plurality of user registration records;

providing the restricted data to the client device if a login request received from the user via the client device meets login criteria;

transmitting a registration user interface including registration data to the client device if the user identifier provided by the user via the first user interface is not associated with any of the plurality of the user registration records; and providing the restricted data to the client device if a registration request is received from the user via the client device.

22. The non-transitory computer readable storage medium of claim 21, wherein the at least one processor further performs the step of:

receiving, from the client device, a login request to access the restricted data, the login request including the user identifier provided in the initial request and a password provided after the step of transmitting the login data.

23. The non-transitory computer readable storage medium of claim 21, wherein the at least one processor further performs the step of:

receiving, from the client device, a registration request to access the restricted data, the registration request including the user identifier provided in the initial request and a password provided after the step of transmitting the registration data.

24. The non-transitory computer readable storage medium of claim 21, wherein the user identifier is an email address of the user.

25. The non-transitory computer readable storage medium of claim 21, wherein the login data includes the user identifier provided in the initial request and a user-fillable password field configured to receive a user password associated with the user identifier.

26. The non-transitory computer readable storage medium of claim 21, wherein the registration data includes the user identifier provided in the initial request and a user-fillable password field configured to receive a user password associated with the user identifier.

27. The non-transitory computer readable storage medium of claim 21, wherein the initial request for access is a request for access to a restricted web page of a website.

28. The non-transitory computer readable storage medium of claim 21, wherein the login data comprises a web page.

29. The non-transitory computer readable storage medium of claim 21, wherein the registration data comprises a web page.

30. The non-transitory computer readable storage medium of claim 21, wherein the user identifier is the only user-provided data in the initial request.

* * * * *